United States Patent [19]

Tetsumura

[11] Patent Number: 5,793,409
[45] Date of Patent: Aug. 11, 1998

[54] APPARATUS FOR GRASPING TV VIEWING CONDITION IN HOUSEHOLD

[75] Inventor: Toshio Tetsumura, Higashiosaka, Japan

[73] Assignee: Kabushikigaisha Shogakuikueisha Kyoikukenkyusho, Osaka, Japan

[21] Appl. No.: 994,068

[22] Filed: Dec. 18, 1992

Related U.S. Application Data

[63] Continuation of Ser. No. 689,886, May 28, 1991, abandoned.

[30] Foreign Application Priority Data

Jan. 9, 1989 [JP] Japan .......................... 1-2521
Oct. 17, 1989 [JP] Japan .......................... 1-271266

[51] Int. Cl.⁶ ..................................... H04N 7/00
[52] U.S. Cl. ........................... 348/1; 348/2; 455/2
[58] Field of Search ................... 358/84, 86; 455/2; 340/522, 567, 573; 367/93, 94; 348/1, 2

[56] References Cited

U.S. PATENT DOCUMENTS

| | | |
|---|---|---|
| 4,112,419 | 9/1978 | Kinoshita et al. .......................... 367/93 |
| 4,567,511 | 1/1986 | Smith et al. |
| 4,746,910 | 5/1988 | Pfister et al. .......................... 340/567 |
| 4,769,697 | 9/1988 | Gilley et al. .......................... 455/2 |
| 4,772,875 | 9/1988 | Maddox et al. .......................... 340/522 |
| 4,779,198 | 10/1988 | Lurie .......................... 455/2 |
| 4,849,737 | 7/1989 | Kirihata et al. .......................... 340/567 |
| 4,931,865 | 6/1990 | Scarampi .......................... 455/2 |
| 5,189,393 | 2/1993 | Jensen .......................... 340/522 |

*Primary Examiner*—Edward F. Urban
*Attorney, Agent, or Firm*—Nikaido Marmelstein Murray & Oram, LLP

[57] ABSTRACT

This invention relates to an audience state measuring apparatus of a television including an existence sensor (2) for detecting the number of persons (3) near a television receiver (1), a setter (4) for registering who is or are watching the program which is being broadcasted and an alarm lamp (6) for reporting that the number of persons from the existence sensor (2) and the registered number from the setter are inconsistent. This apparatus makes it possible to dertimine who among one family is or are watching the specific program which is being broadcasted and to measure accurately the individual audience state because non-registration in the setter (4) is reported to the persons (3).

11 Claims, 10 Drawing Sheets

Fig.8
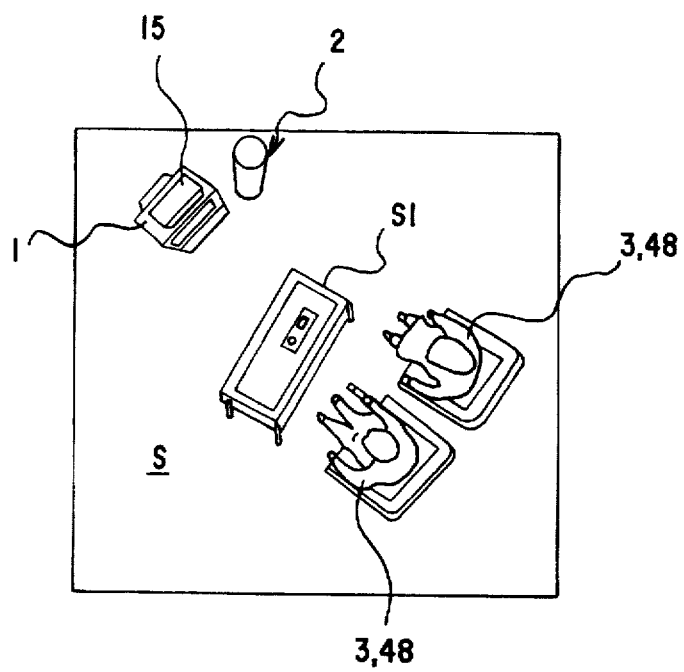
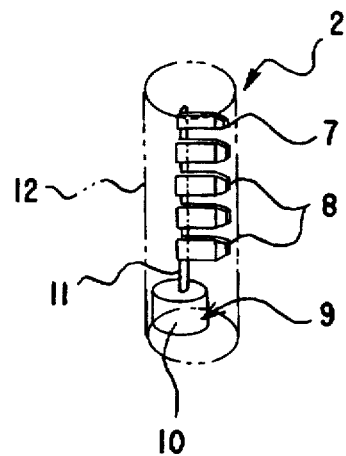
Fig.4

5,793,409

1

APPARATUS FOR GRASPING TV VIEWING CONDITION IN HOUSEHOLD

This application is a continuation of application Ser. No. 689,886 filed May 28, 1991 now abandoned.

TECHNICAL FIELD

This invention relates to an audience state measuring apparatus for measuring how many people are watching a program which is being broadcast, or who among the family watching a program which is now being broadcast.

BACKGROUND ART

An audience state and an audience rating of a television program is investigated at present by paying visits to homes one by one and setting out questionnaires, or by fitting an audience state measuring apparatus to a television receiver of each family sampled at random.

This measuring apparatus can detect which program is watched by the family but cannot detect accurately an individual audience state, that is, who among the family is or are watching the program. The questionnaire method is one of the methods which make up for this problem. However, the questionnaire method involves the problems that fill-out of the questionnaire is troublesome and lapse of memory is likely to frequently occur. Therefore, it has not yet been possible to investigate correctly the individual audience state.

In the information-oriented society at present, however, it is very important to grasp how many, and who, among one family are watching a specific program which is now being broadcast.

Accordingly, the present invention is directed to provide an audience state measuring apparatus of television which can detect and determine an accurate audience rating and can measure a correct individual audience state by determining how many persons, and who, among one family, are watching a specific program which is now being broadcast.

DISCLOSURE OF THE INVENTION

An audience state measuring apparatus of television in accordance with the present invention includes an existence sensor for detecting the number of existing persons near a television receiver, a setter for setting who is or are watching a program which is being broadcast, report means for reporting inconsistency between a number-of-existing-persons signal from the existence sensor and a set number signal from the setter to the audience(s), and a controller for comparing the number-of-existing-persons signal with the set number signal, and this controller is provided with the function of outputting a report signal to the report means when the result of comparison proves inconsistent. Accordingly, the measuring apparatus of the invention can detect and determine a correct audience rating and can measure an accurate individual audience state by determining who among one family is or are watching a specific program which is now being broadcast.

2

Figure 6:
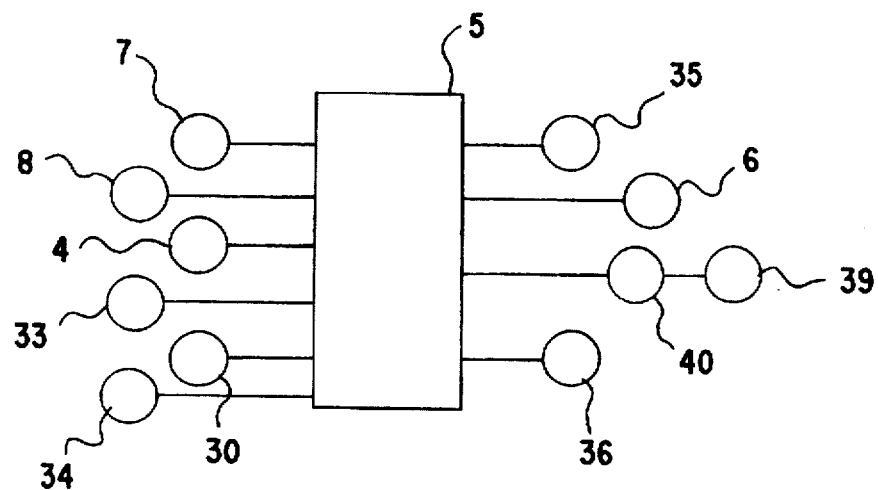
Figure 5:
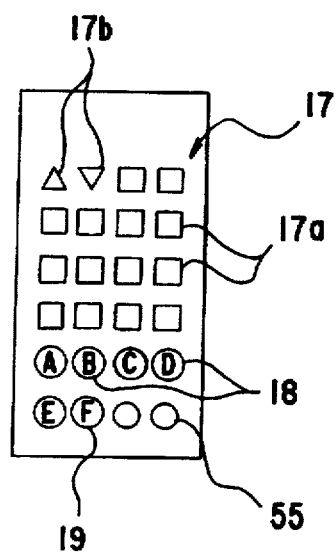
Figure 7:
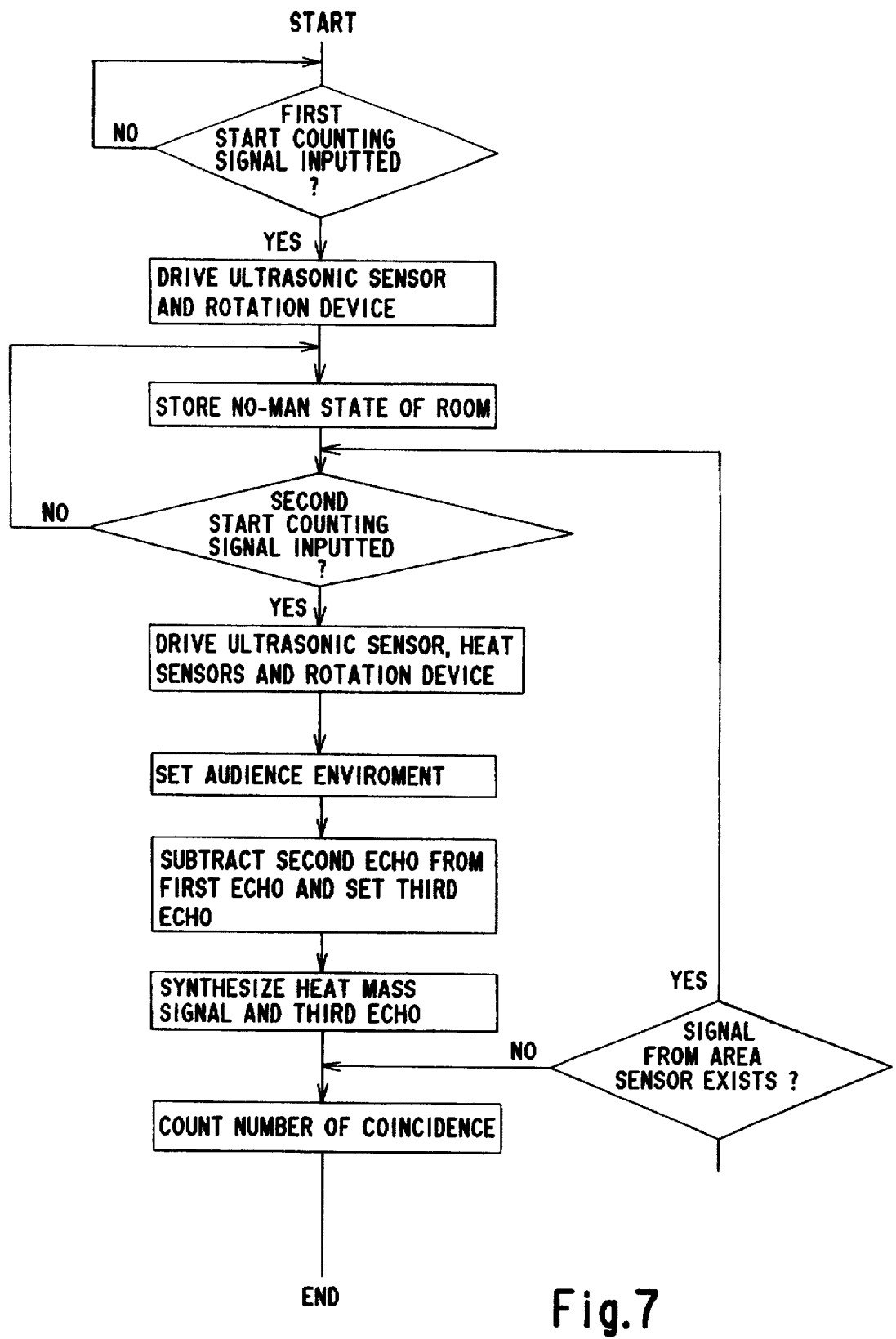
Figure 9:
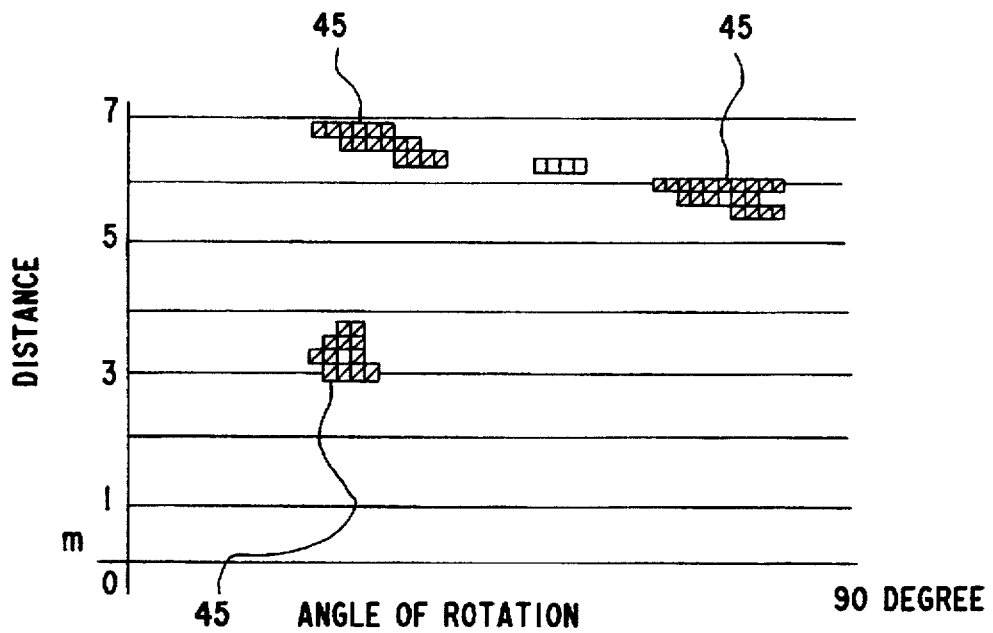
Figure 10:
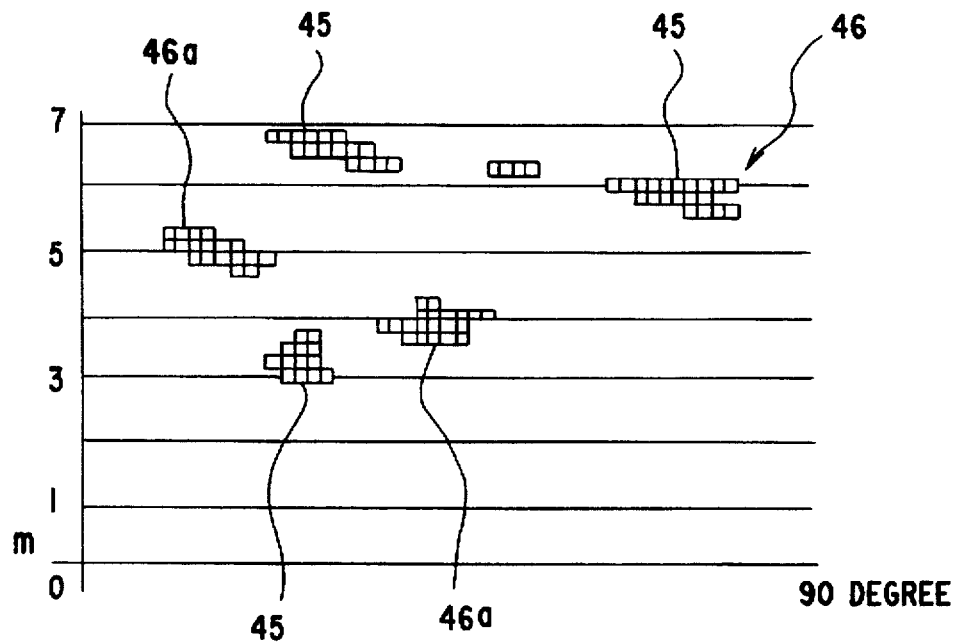
Figure 11:
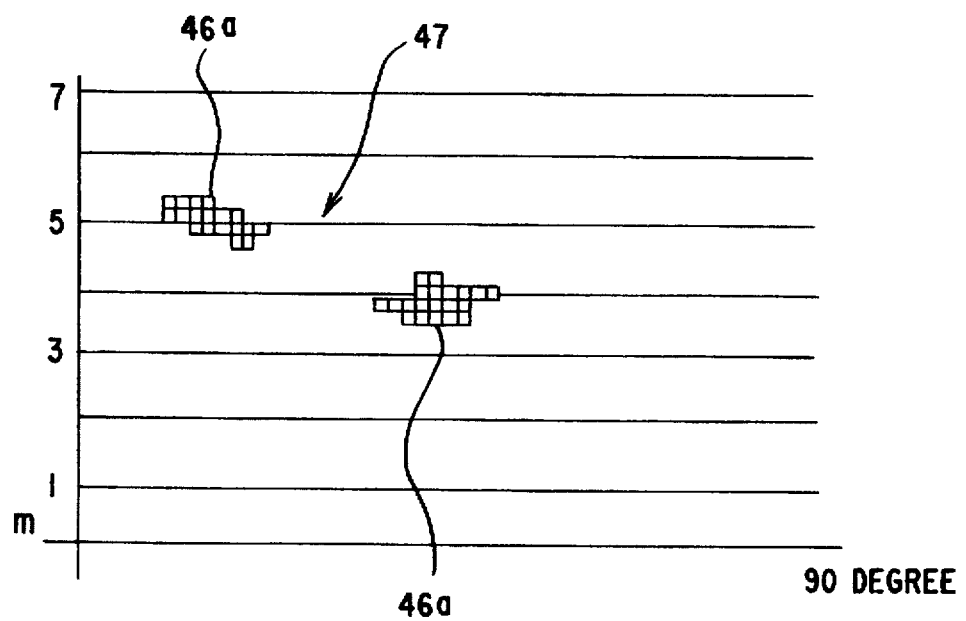
Figure 12:
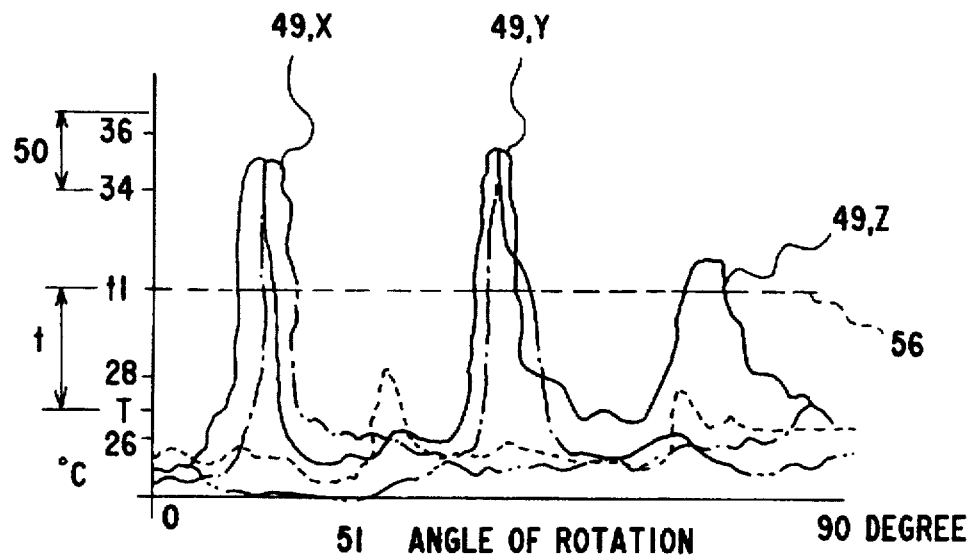
Figure 13:
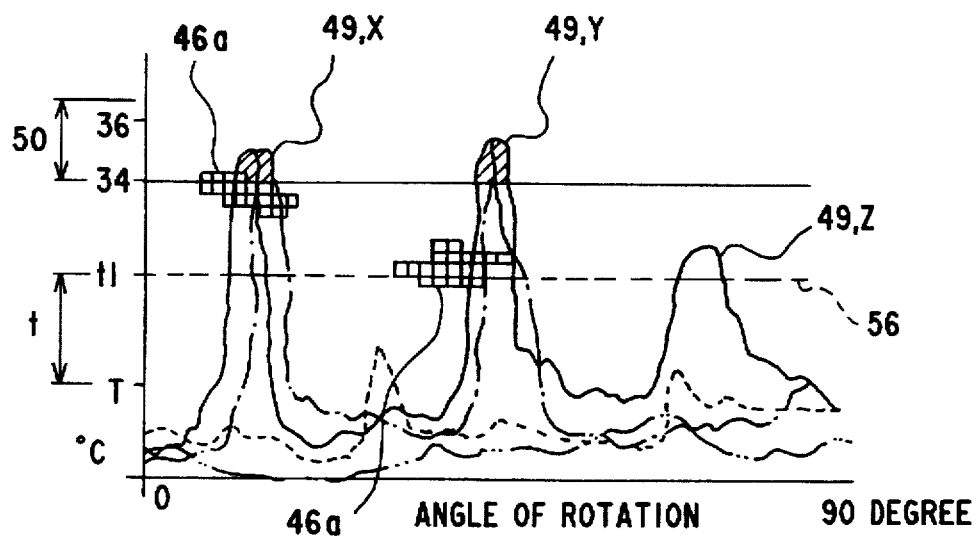
Figure 14A:
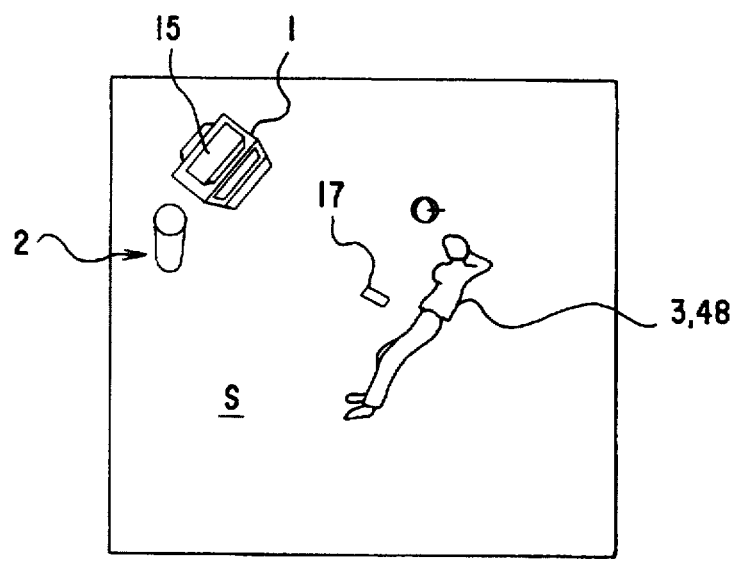
Figure 14B:
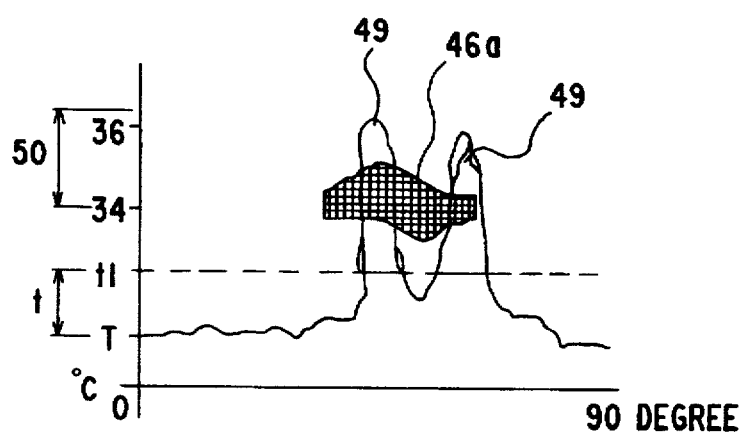
Figure 15A:
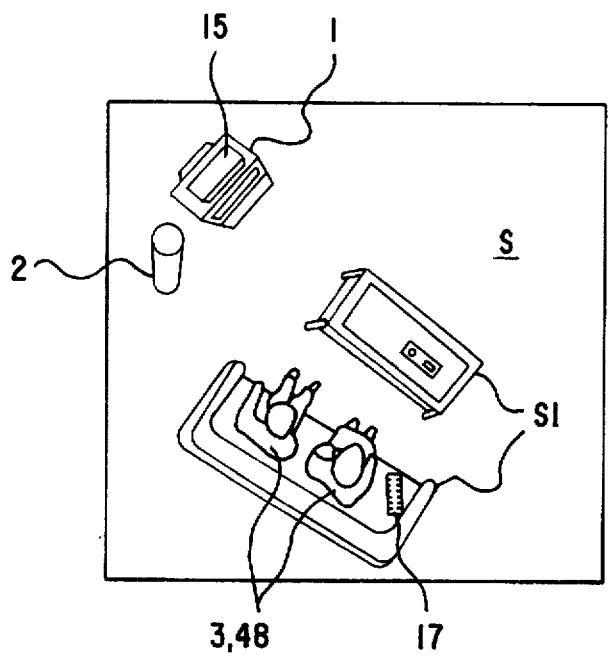

FIG. 4 is a perspective view of an existence sensor;

FIG. 5 is a structural view of a remote controller;

FIG. 6 is a simplified control block diagram;

FIG. 7 is a counting control flowchart;

FIG. 8 is a plan view of an ordinary audience state;

FIGS. 9 to 11 are diagrams showing echos of objects that exist in a room and are detected by an ultrasonic sensor;

FIG. 12 is a diagram showing thermal waveforms of objects detected by heat sensors;

FIG. 13 is a diagram obtained by combining FIGS. 11 and 12 with each other;

FIG. 14a is a plan view of an audience state where a person is lying horizontally;

FIG. 14b is a synthetic diagram obtained from the audience state of FIG. 14a;

FIG. 15a is a plan view in the audience state of an overlap posture; and

Figure 15B:
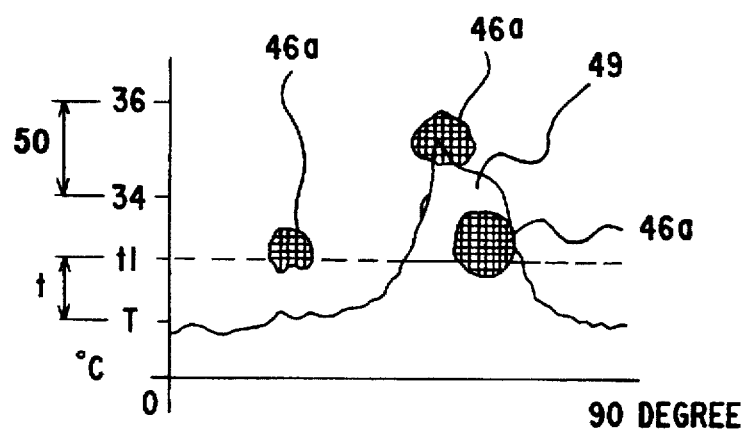

FIG. 15b is a synthetic diagram obtained from the overlap posture of FIG. 15a.

BEST MODE FOR CARRYING OUT THE INVENTION

Hereinafter, the present invention will be described in further detail with reference to FIGS. 1 to 15 of the accompanying drawings.

Figure 1:
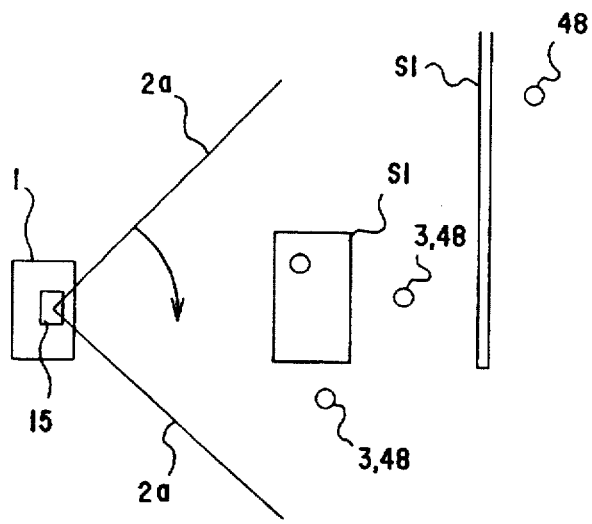
FIG. 1 is a plan view inside a room and useful for explaining the control by a controller in accordance with the present invention.
Figure 2:
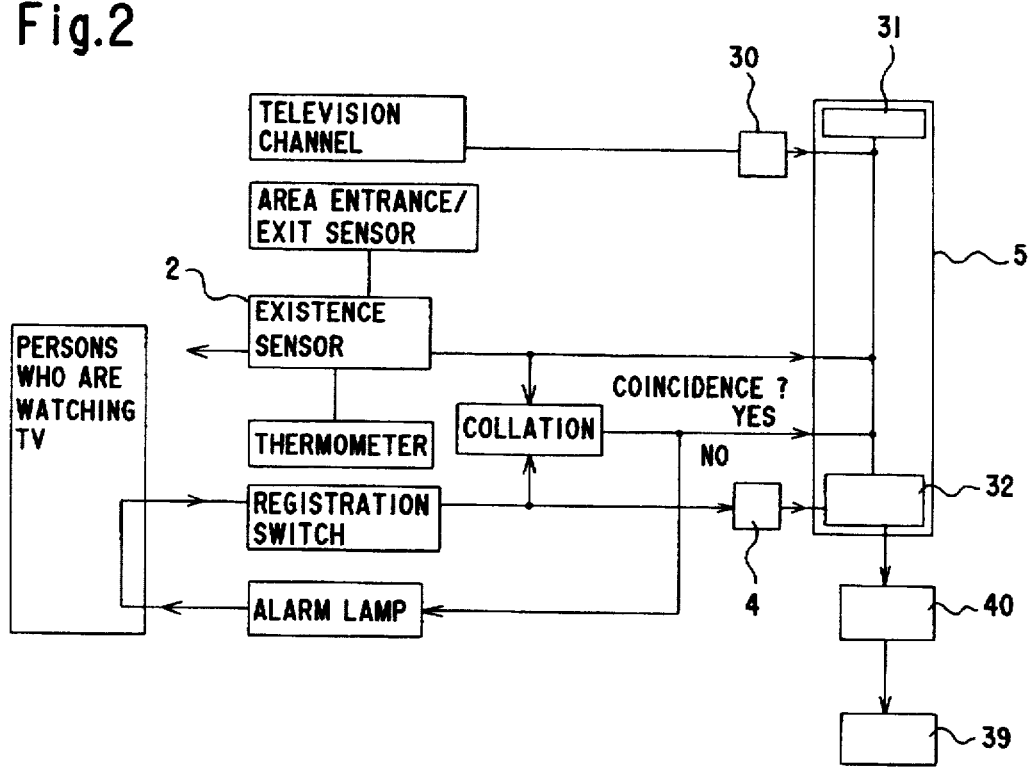
FIG. 2 is a control block diagram.
Figure 3:
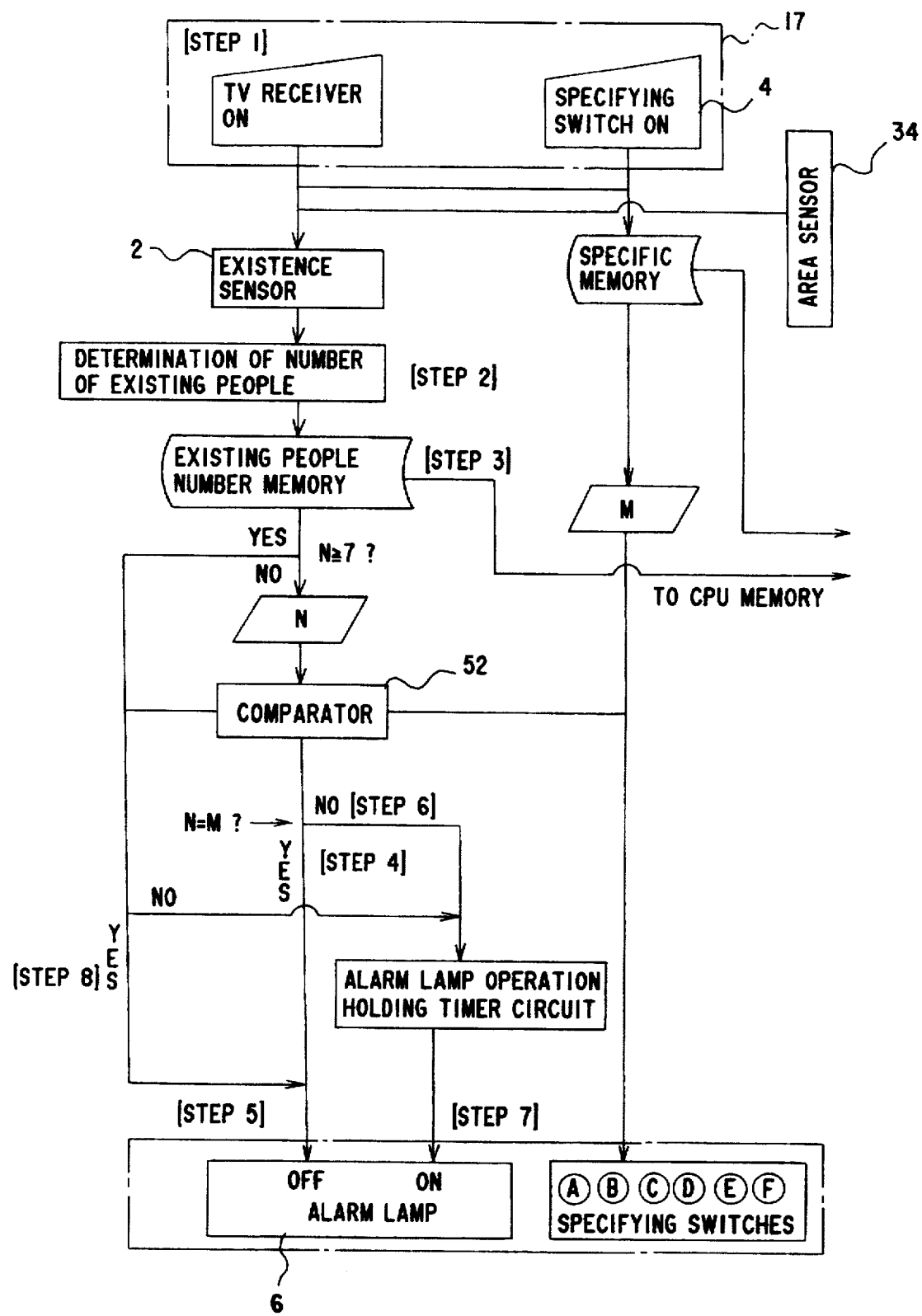
FIG. 3 is a control flowchart.

As illustrated in FIGS. 1 to 4, a television audience state measuring apparatus in accordance with the present invention includes an existence sensor 2 for detecting the number of persons existing near a television receiver 1, a setter 4 for setting who are watching the program which is being broadcast at present among the audiences 3 described above and for setting the start of counting of the number of persons who are watching the TV, and a controller 5 for outputting as a report signal inconsistency between the detected number-of-persons signal N and the set number signal M from the setter 4 to a red emission alarm lamp 6 as report means as shown in FIGS. 2 and 3.

The existence sensor 2 described above comprises one ultrasonic sensor 7, four IR (infrared) beam detection heat sensors 8 aligned in a vertical direction below the ultrasonic sensor 7 and a rotation device 9 for supporting the ultrasonic sensor 7 and the heat sensors 8 and rotating by only 90° inside a horizontal plane in a room S as shown in FIG. 4.

The ultrasonic sensor 7 described above is of a compact type of ultrasonic transducers used generally for a fishfinder. This sensor 7 oscillates an ultrasonic wave 2a of an oscillation frequency of 24 KHz and obtains data of objects e.g. position, size, etc, existing inside the room S such as walls, table Si, etc, from the reflected echoes from these objects.

Each heat sensor 8 is the one that is obtained by reducing compactly the size of a high-precision radiation thermometer and has a pyro-electric device capable of detecting infrared rays emitted from the objects inside the room. The sensor 8 can measure the temperature within the range of from 0° C. to 50° C.

The rotation device 9 comprises a rotary table 10, a fitting rod 11 implanted rotatably onto the rotary table 10 and a stepping motor (not shown) as a driving unit for rotating the fitting rod 11 as shown in FIG. 4.

The ultrasonic sensor 7 is fitted to the upper end of the fitting rod 11 and the heat sensors 8 are aligned on the fitting rod 11 in its vertical direction with spacings of about 20 cm. The angle of rotation of this fitting rod 11 is set to be within the range of up to 90°.

Reference numeral 12 in FIG. 4 denotes a cover for protecting the ultrasonic sensor 7 and the heat sensors 8.

The setter 4 and the controller 5 are stored in the measuring apparatus main body 15 fitted to the television receiver 1 as shown in FIG. 1 and the setter 4 is operated by the operation of a remote controller 17 shown in FIG. 5.

As shown in FIG. 5, specifying switches 18 are aligned with channel operation switches 17a and volume control switches 17b of the remote controller 17 and these specifying switches 18 are operated while they are directed to the reception portion of the setter 4. The number of these specifying switches 18 is determined in accordance with the number of persons of one family. If the family consists of five persons, for example, five specifying switches 18 and a switch 19 for a guest, six switches in all, are provided. Symbols or characters such as A, B, C, D, E, F, etc are allotted to these specifying switches 18 inclusive of the switch 19 and are allotted also to the members of the family such as A for "father", B, C and D for "children", E for "mother" and F for "guest". The controller 5 includes a channel detector 30 for detecting the channel number of on-air program and the time, time counting means 31 as shown in FIG. 2 and memory means 32 for storing the channel number and the time by the channel signal from the channel detector 30 and the time signal from the time counting means 31.

The controller 5 is an ordinary one-chip micro-computer. As shown in FIGS. 2 and 6, the setter 4, a thermometer 33, a channel detector 30 and a detection unit of an area sensor 34 which is disposed at the entrance of the room and detects a moving object are connected to the input side of the controller 5 and a counting display 35 which is fitted to the television receiver 1 or the like and displays how many persons are watching the television at present, a telephone line 36, a host computer 39, a MODEM 40 and the alarm lamp 6 are connected to the output side of the controller 5.

The controller 5 is provided with the function of counting the number of existing persons and this function will be explained in further detail. As shown in FIG. 5, the controller 5 has the function of controlling the operations of the ultrasonic sensor 7, the heat sensors 8 and the rotation device 9 by a first counting-start signal from the setter, the function of storing the first echo 45 of the no-man state inside the room which is obtained by the operation of the rotation device 9 and the ultrasonic sensor 7 as shown in FIG. 9, the function of outputting driving signals to the driving units of the rotation device 9, ultrasonic sensor 7 and heat sensors 8 by a second counting-start signal as the ON signal of the television set 1, the function of subtracting the first echo 45 from the ultrasonic second echo 46 of the audience state which is obtained by the operations of the rotation device 9 and ultrasonic sensor 7 as shown in FIGS. 10 and 11 and assuming an ultrasonic third echo 47 of the balance to be the number of persons 48 who are actually watching the television among the existing persons, the function of determining judging whether or not a heat mass signal 49 which is obtained by the operation of the heat sensors 8 and is shown in FIG. 12 is within a human body temperature range 50, the function of estimating the person as one of the audience and counting their number when the third echo 47 coincides with the heat mass signal 49 within the human body temperature range 50 as shown in FIG. 13, the function of outputting again the driving signals to the rotation device 9, ultrasonic sensor 7 and heat sensors 8 by a moving object detection signal from the area sensor 34 for detecting the moving object, the function of calculating a mean room temperature T within a predetermined time from the detected room temperature signal from the thermometer 33 and storing the mean room temperature T, and the function of dividing into two parts the heat signal 51 from the heat sensors 8 which changes continuously with a temperature t1 higher by a predetermined value t than this mean room temperature T.

In the construction described above, when the television receiver 1 is turned ON |step 1|, the existence sensor 2 and the temperature sensor 75 operate and detect the number of existing persons near the television receiver 1 |step 2, step 3|. The detailed detection process of the existing people will be described later.

Here, the existing person 3 push the specifying switches 18 allotted to each member of the family and who are watching the program now on-air among the family members is set |step 4|.

Assuming that the existence sensor 2 detects the existence of four persons and that four specifying switches A to D are turned ON, the degree of cooperation is 4/4=1 and N=M. Therefore, the controller 5 determines this state as the ordinary audience state through a comparator 52 and the present audience state is sent to the host computer 39 through the MODEM 40 and the telephone line. In this case the controller 5 does not output the report signal to the alarm lamp 6 |step 5|.

If five specifying switches 18, i.e. A to E, are turned ON although the existence sensor 2 detects the existence of four persons |step 6|, the degree of cooperation is 5/4≠1, N≠M and the controller 5 outputs the report signal to a blinking operation holding timer circuit of the alarm lamp 6. Then, the alarm lamp 6 turns ON and OFF for 30 seconds and reports the users that the existing people number signal N and the set number signal M are inconsistent |step 7|.

If the existence sensor 2 detects the existence of four persons even after the blinking operation of the alarm lamp 6 for 30 seconds and five specifying switches 18, i.e. A to E, are kept ON consecutively, a determination is made that five persons exist, and a command is output so as to change the alarm lamp 6 from the blinking signal to the ON signal. The controller 5 stores the audience state, that is, how many persons 48 are watching the program of a given channel at a given time, and who are the persons among the family members.

The audience state described above, that is, the audience state where the A to E five specifying switches 18 are kept ON although the existence sensor 2 detects the existence of four persons might represent the state where the wife is doing kitchen work, for example, and is listening only to the sound without watching the television screen.

Incidentally, the controller 5 stores the signal which is output from the existence sensor 2 immediately before. Therefore, this signal is erased by the input of a new signal and only the new signal is stored and held.

There might be the audience state where the degree of cooperation is 4/5≠1 and N≠M. This represents the state where the A to D four specifying switches 18 are kept ON although the existence sensor 2 detects the existence of five persons. In other words, this might be the state where one of the five persons does not view the program for some reason or other. To confirm this state the controller 5 outputs the report signal to the blinking operation holding timer circuit of the alarm lamp 6. If any of the existing persons 3 forgets to turn ON the specifying switch 18, he will be reminded of the fact by the blinking of the alarm lamp 6 and will turn ON his specifying switch 18.

Thereafter, the controller 5 stores the number of persons 48 watching the program, the channel, the time and the names of the persons among the family. The controller 5 stores the audience state and at the same time, passes instantaneously the audience state to the host computer 39, whenever necessary, in the same way as described above.

If the existing number-of-persons signal N from the existence sensor 2 is 6 or more or in other words, if the existence sensor 2 detects the existence of six or more persons, it means that a guest or guests exist. Therefore, the controller 5 confirms whether or not the switch 19 is turned ON [step 8]. If the switch 19 is not turned ON, the controller 5 outputs the blinking signal to the alarm lamp 6 and the alarm lamp 6 is turned ON and OFF for 30 seconds to warn the existing persons 3 that the switch 19 is not turned ON. Receiving this report, someone of the existing per sons 3 turns ON the switch 19.

Next, the existing number-of-persons detection process by the existence sensor 2 will be explained. In order to have this explanation more easily comprehensible, the image processing carried out in the course of experiments will be employed for the explanation.

First, the ordinary audience state such as shown in FIG. 8a or the state where the existing persons 3 are apart from one another and the existence sensor 2 detects them substantially from the front will be explained.

First of all, t he persons 48 watching the television must output in advance the first counting start signal to the driving unit of the setter 4 by the remote controller and must set the no-man state of the room in order to set the objects existing inside the room under the no-man state. This signal is generated by the ON operation of the counting start switch 55. In other words, when someone of the persons 48 turns ON the counting start switch 55 provided in the remote controller by directing the switch 55 towards the setter 4, the controller 5 outputs the signal to the driving unit of the rotation device 9 so that it rotates clockwise by 90° and then stops. The controller 5 outputs also the driving signal to the driving unit of the ultrasonic sensor 7.

Here, FIG. 9 shows the first echo 45 in the no-man state of the room with the abscissa representing the angle of rotation of the ultrasonic sensor 7 and the ordinate representing the distance from the ultrasonic sensor 7. However, the controller 5 stores, as the first echo 45, only those objects in the room S, e.g. walls, table S1, etc, which are designated by ten or more external blocks shaded by oblique lines in the drawing. The state represented by this first echo 45 is the no-man state where no person exists inside the room. The controller 5 stores the no-man state of the room obtained by the operation described above.

When someone 48 want to watch a program and turns ON the television receiver 1, this signal is output as the counting start second signal to the controller 5. Then, the controller 5 outputs the signal which rotates the rotation device 9 in the counter-clockwise direction and outputs also the driving signals to the ultrasonic sensor 7 and to the heat sensors 8. This operation generates the second echo 46 in the image as the sum of the echo 46a of the persons 48 and the first echo 45, as shown in FIG. 10. Next, the controller 5 makes the predetermined subtraction operation of subtracting the first echo 45 which is stored in advance from the second echo 46, providing the third echo 47 such as shown in FIG. 11. This third echo 47 shows the candidates as the persons 48.

The controller 5 drives the heat sensors 8 by the counting start second signal, and thus an image is obtained such as shown in FIG. 12. In other words, FIG. 12 is a diagram of the heat mass signal 49 wherein the abscissa represents the angle of rotation of the heat sensor 8 and the ordinate does the temperatures of the objects existing inside the room S.

The controller 5 combines the third echo 47 shown in FIG. 11 with the heat mass signal 49 shown in FIG. 12 and divides the graph of the heat signal 51 by a waveform separation line 56 drawn at a temperature t1 higher by a predetermined value t than the mean room temperature T. An example of the image thus obtained is the one shown in FIG. 13. With the four heat sensors 8, respective waveforms for the four channels are formed by scanning and they are converted to a linear image by edging the edge of the upper waveform portions cut by the waveform separation line 56. In this manner the heat mass signal 49 representing a temperature above a predetermined temperature can be obtained.

In FIGS. 12 and 13, the heat mass signals 49 is divided into three regions X, Y, Z by the waveform separation line 56. The two heat mass signals 49 of the X and Y regions are partly in the human body temperature zone 50 and become therefore the candidates as the persons 48. However, since the heat mass signal 49 of the Z region are not in the human body temperature zone 50, at all, it is excluded from the candidates of the persons 48.

In other words, the controller 5 syntheses the third echo 47 and the heat mass signal 49 on the same axis. When they coincide or when both ends of the third echo 47 are extended if they overlap even partially with the heat mass signal 49, the controller 48 determines the zones as the persons 48 and counts the number of coincidence.

If the area sensor 34 detects the movement of the moving objects into and out from, or inside, the room S during the operation of the television receiver 1, this signal is output to the controller 5, which outputs the driving signals to the driving units of the rotation device 9, ultrasonic sensor 7 and heat sensors 8, and executes again the counting control described above. The controller 5 stops the control of counting the persons 48 when the OFF signal of the television receiver 1 is generated.

The cases where the number of persons 48 is counted erroneously might be (1) one person 48 is counted as a plurality of persons and (2) a plurality of persons are counted as a single person.

The case (1) is likely to occur when one person 48 watches the television program while lying with naked feet as shown in FIG. 14a. The synthesized image of the third echo 47 and the heat mass signal 49 at this time is such as shown in FIG. 14b. In other words, two heat mass signals 49 are detected at this face and feet but since the third echo 47 is only one, the controller 5 determines the audience 48 as only one.

The case (2) is likely to occur when two persons 48 sit down side by side, and the ultrasonic sensor 7 and the heat sensors 8 are disposed on their side as shown in FIG. 15a. The heat mass signal 49 is only one, the third echos 47 are three. Two of them overlap with the human body temperature zone 50 as shown in FIG. 15b. Therefore, the controller 5 determines the audiences as two.

If the controller 5 detects that the number of persons 48 is only one and detects by the signal from the area sensor 34 that the moving object goes out from the room S, this state represents the case where the television receiver 1 is kept ON under the no-man state in the room or in other words, the state where no person 48 exists in the room S but the television receiver 1 is ON. So long as the television receiver 1 is kept ON, however, the counting control is continued and this case is determined as non-existence of the person 48. When the number of existing persons thus counted does not coincide with the set number signal M from the setter 4, the controller 5 outputs the report signal to the alarm lamp 6.

When the comparison and collation of the existing people number signal N and the set number signal M prove inconsistent as described above, the controller 5 outputs the report signal to the alarm lamp 6 and the existing persons 3 can determined whether or not they have set the setter 4, and turns ON the specifying switch 18 when the setter 4 is not set. In this manner, the accurate audience state can be measured.

Industrial Applicability:

As described above, the audience state measuring apparatus in accordance with the present invention can know quickly the audience rating if it is connected to the telephone line and the result of measurement is applied to the host computer. Accordingly, whether or not broadcasting of a live program scoring a high audience rating should be extended can be determined while the program is on-air.

I claim:

1. A television audience state measuring apparatus comprising:

an existence sensor for detecting a number of people and objects near a television receiver, said existence sensor including an ultrasonic sensor means for detecting objects and a heat sensor means for detecting heat within a predetermined range;

a setter for setting a number of people who are following a program, which is being broadcast, among said number of people near said television receiver who are watching said program and among a number of people who are listening to said program and not near said television receiver;

indicating means for indicating an inconsistency between a signal from said existence sensor and a signal from said setter; and a controller for comparing said signal from said existence sensor with said signal from said setter, for controlling operation of said existence sensor, and for determining number of people near said television receiver based on an output from said ultrasonic sensor means and said heat sensor means;

said existence sensor and said setter being connected to an input side of said controller;

said indicating means being connected to an output side of said controller;

said controller outputting a report signal to said indicating means when said comparison proves inconsistent.

2. A television audience state measuring apparatus according to claim 1 wherein said heat sensor means and said ultrasonic sensor means are aligned in a vertical direction, said existence sensor further comprising a rotation device for rotating and supporting said ultrasonic sensor means and said heat sensor means.

3. A television audience state measuring apparatus according to claim 2, wherein said rotation device includes a rotary table, a fitting rod implanted rotatably onto said rotary table and a driving unit for rotating said fitting rod.

4. A television audience state measuring apparatus according to claim 1, wherein said heat sensor means detects temperature within a range of 0° C. to 50° C.

5. A television audience state measuring apparatus according to claim 1, wherein said controller determining the number of people near said television receiver does so by determining the number of objects from said ultrasonic sensor means and determining which of said objects has a temperature within a human body range detected by said heat sensor means.

6. A television audience state measuring apparatus according to claim 1 further comprising a thermometer for detecting room temperature.

7. A television audience state measuring apparatus according to claim 2 further comprising an area sensor for detecting moving objects near an entrance to a room containing said television receiver and outputting a signal to said controller.

8. A television audience state measuring apparatus according to claim 7, wherein when said area sensor detects a moving object, said controller outputs drive signals to rotate said rotation device.

9. A television audience state measuring apparatus according to claim 1, wherein said setter including a plurality of switches, each switch allocated for one member of a family and one of said switches allocated for a non-family member.

10. A television audience state measuring apparatus according to claim 9, wherein said controller stores an audience state based on output from said setter and said existence sensor, and stores names of each member of said family indicated by activation of respective switches.

11. A television audience state measuring apparatus according to claim 1, wherein said controller is connected via a communication means to a host computer to determine a real-time audience rating of a broadcast program.

* * * * *

UNITED STATES PATENT AND TRADEMARK OFFICE
CERTIFICATE OF CORRECTION

PATENT NO. : 5,793,409
DATED : August 11, 1998
INVENTOR(S) : Toshio Tetsumura

It is certified that error appears in the above-identified patent and that said Letters Patent is hereby corrected as shown below:

On the title page, item [63] should read--

Related U.S. Application Data

[63] Continuation of Ser. No. 689,886, filed as PCT/JP89/01183, Nov. 20, 1989, abandoned. --.

Signed and Sealed this

Twenty-third Day of February, 1999

Attest:

Q. TODD DICKINSON

Attesting Officer

Acting Commissioner of Patents and Trademarks